US012770371B2

(12) United States Patent
Okubo

(10) Patent No.: US 12,770,371 B2
(45) Date of Patent: Oct. 20, 2026

(54) MACHINE LEARNING DEVICE

(71) Applicant: SUBARU CORPORATION, Tokyo (JP)

(72) Inventor: Toshimi Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/926,850

(22) PCT Filed: Jul. 7, 2021

(86) PCT No.: PCT/JP2021/025580
§ 371 (c)(1),
(2) Date: Nov. 21, 2022

(87) PCT Pub. No.: WO2023/281647
PCT Pub. Date: Jan. 12, 2023

(65) Prior Publication Data

US 2024/0233336 A1 Jul. 11, 2024

(51) Int. Cl.
*G06V 10/774* (2022.01)
*G06T 7/593* (2017.01)
(Continued)

(52) U.S. Cl.
CPC ............ *G06V 10/774* (2022.01); *G06T 7/593* (2017.01); *G06V 10/82* (2022.01); *G06V 20/58* (2022.01);
(Continued)

(58) Field of Classification Search
None
See application file for complete search history.

(56) References Cited

U.S. PATENT DOCUMENTS 10,262,214 B1 * 4/2019 Kim .................... G06V 10/764
2009/0041337 A1 * 2/2009 Nakano ................ G06V 20/588 348/E7.086
2019/0197704 A1 * 6/2019 Okubo ...................... G06T 7/12

FOREIGN PATENT DOCUMENTS

JP 2018-26021 A 2/2018
JP 2018-147286 A 9/2018
(Continued)

OTHER PUBLICATIONS

Eigen et al., "Depth Map Prediction from a Single Image using a Multi-Scale Deep Network," Advances in Neural Information Processing Systems 27 (NIPS) (Year: 2014).*
(Continued)

*Primary Examiner* — Vincent Rudolph
(74) *Attorney, Agent, or Firm* — TROUTMAN PEPPER LOCKE LLP

(57) ABSTRACT

A machine learning device according to an embodiment of the disclosure includes: a road surface detection processor configured to detect, on the basis of a first captured image and a first distance image depending on the first captured image, a road surface included in the first captured image; a distance value selector configured to select one or more distance values to be processed, from among distance values included in the first distance image, on the basis of a processing result of the road surface detection processor; and a learning processor configured to generate a learning model to be supplied with a second captured image and to output a second distance image depending on the second captured image, by carrying out machine learning processing on the basis of the first captured image and the one or more distance values.

1 Claim, 11 Drawing Sheets

(51) Int. Cl.
*G06V 10/82* (2022.01)
*G06V 20/56* (2022.01)
*G06V 20/58* (2022.01)
*G06V 20/64* (2022.01)

(52) U.S. Cl.
CPC ............ *G06V 20/588* (2022.01); *G06V 20/64* (2022.01); *G06T 2207/10012* (2013.01); *G06T 2207/20081* (2013.01); *G06T 2207/20084* (2013.01); *G06T 2207/30256* (2013.01)

(56) References Cited

FOREIGN PATENT DOCUMENTS

| | | |
|---|---|---|
| JP | 2019-114149 A | 7/2019 |
| JP | 2019-125116 A | 7/2019 |

OTHER PUBLICATIONS

Ma et al., "Sparse-to-Dense: Depth Prediction from Sparse Depth Samples and a Single Image," 2018 IEEE International Conference on Robots and Automation (ICRA), pp. 4796-4803 (Year: 2018).*
Notice of Reasons for Refusal issued in Japanese Patent Application No. 2023-532939 dated Sep. 3, 2024 with machine translation.

* cited by examiner

[ FIG. 1 ]
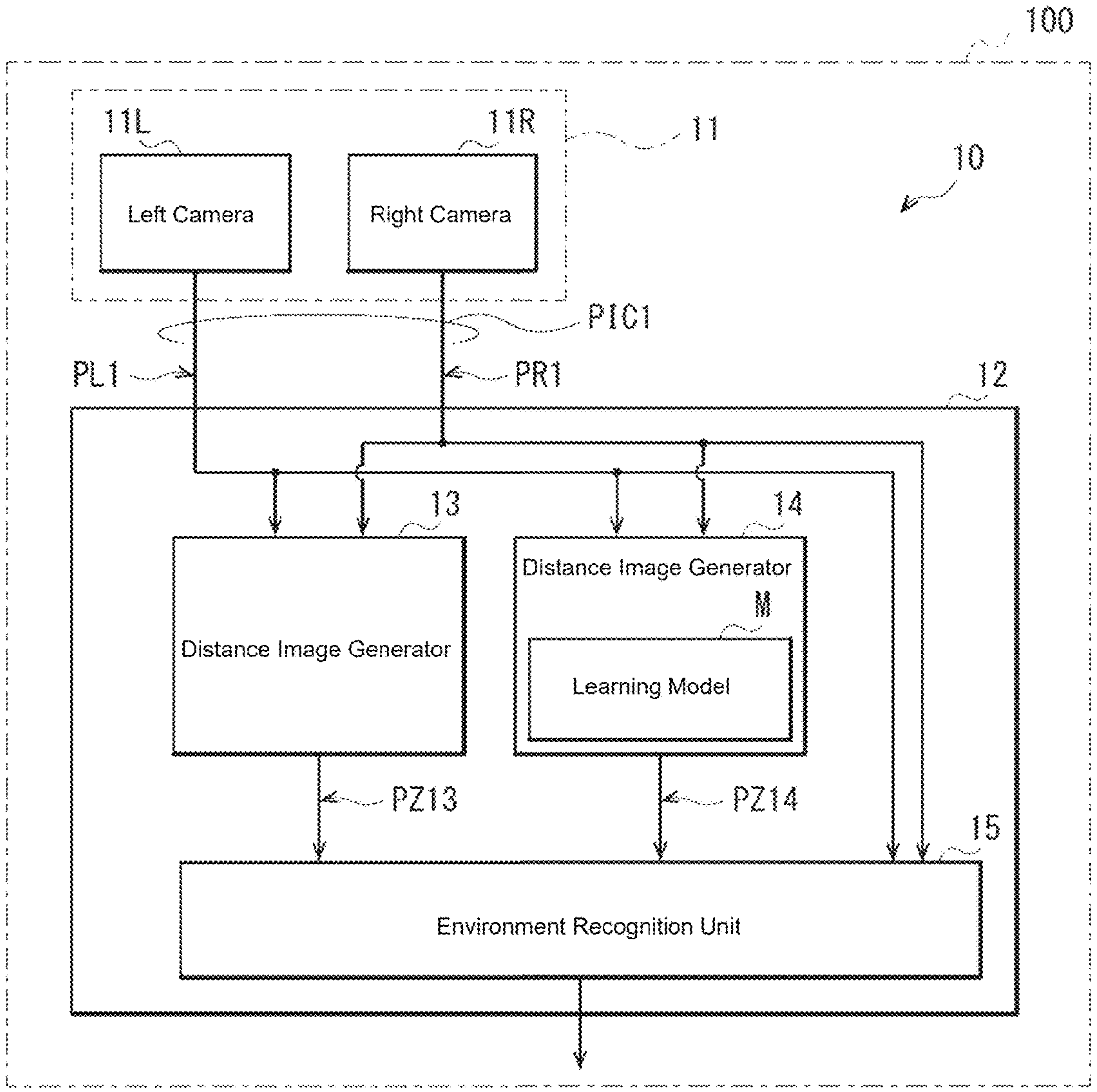

[ FIG. 2 ]
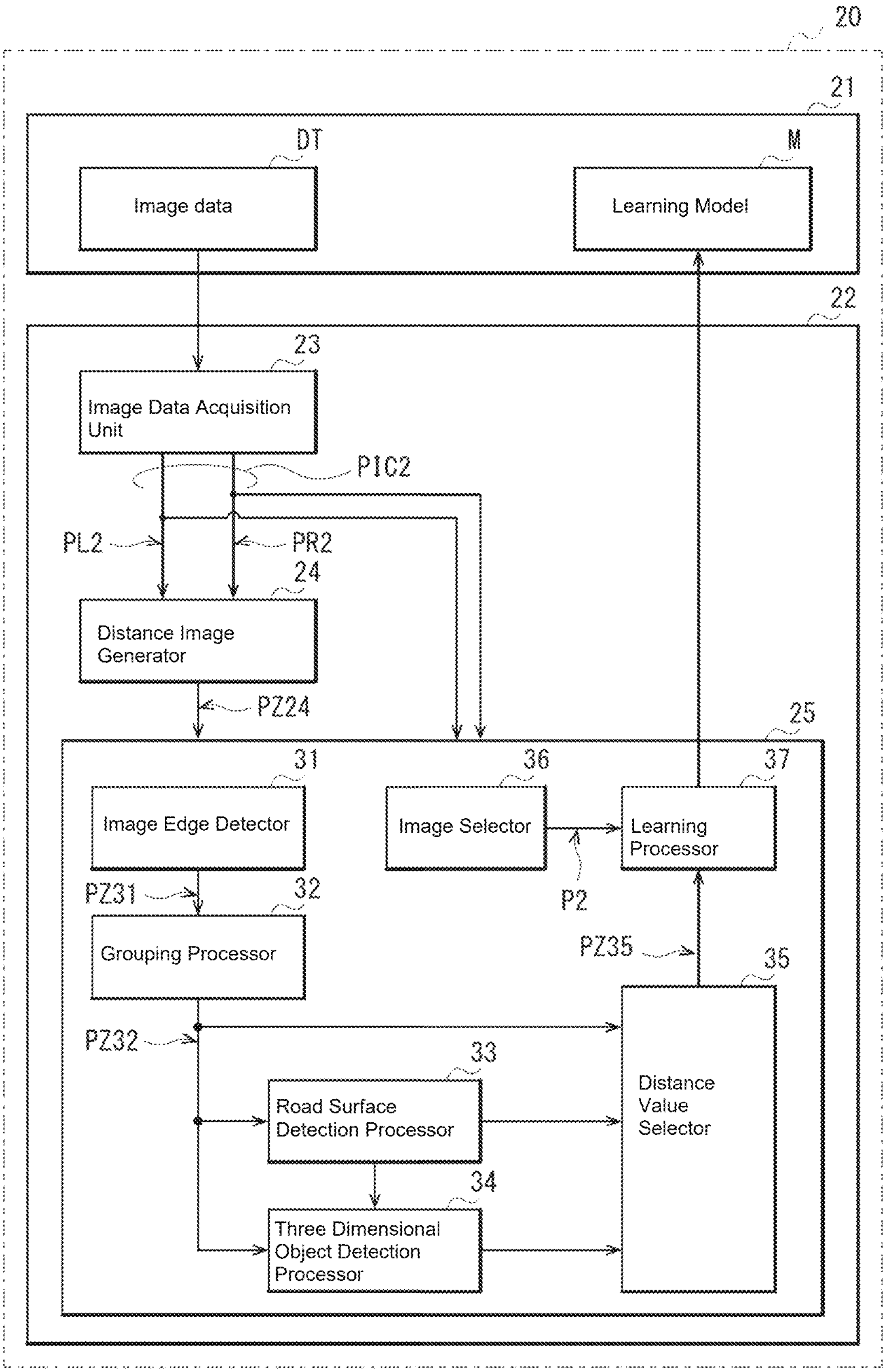

[ FIG. 3 ]
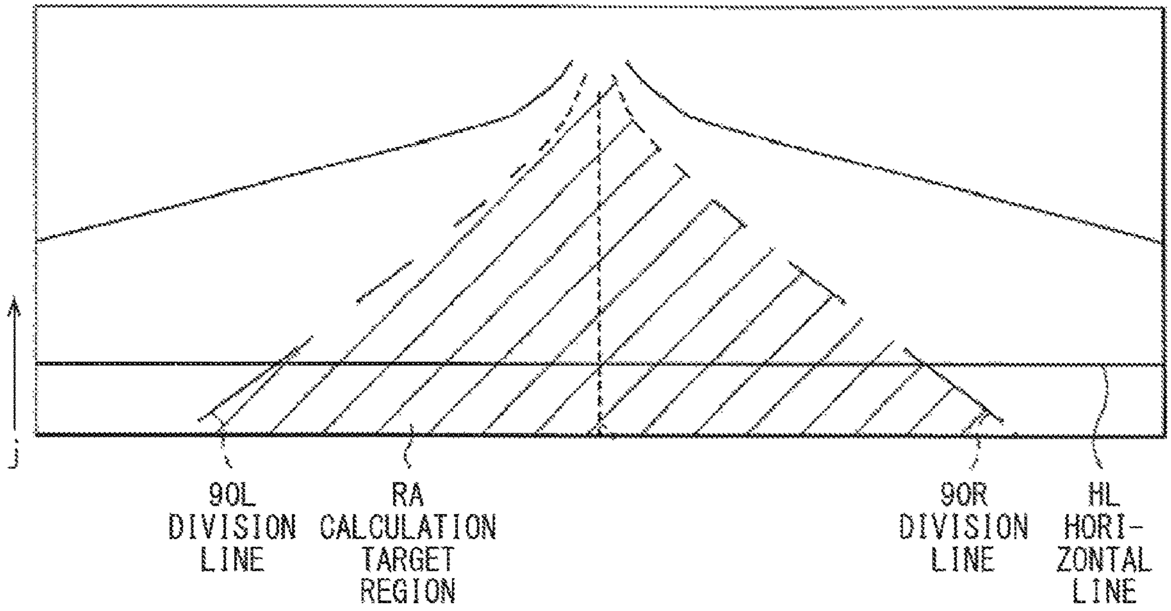
[ FIG. 4 ]
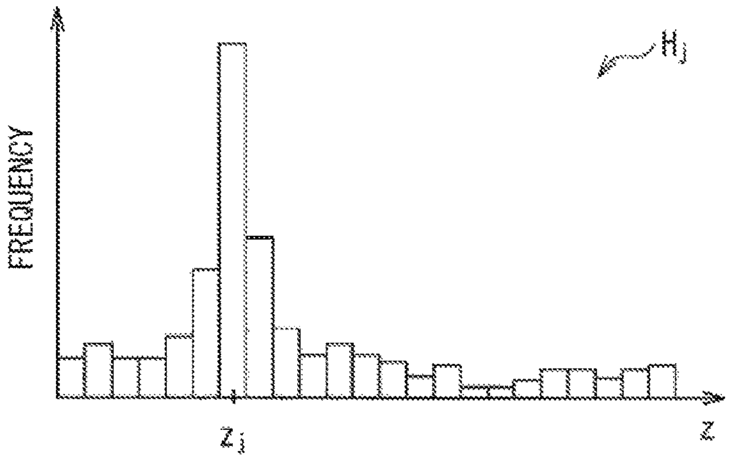

[ FIG. 5 ]
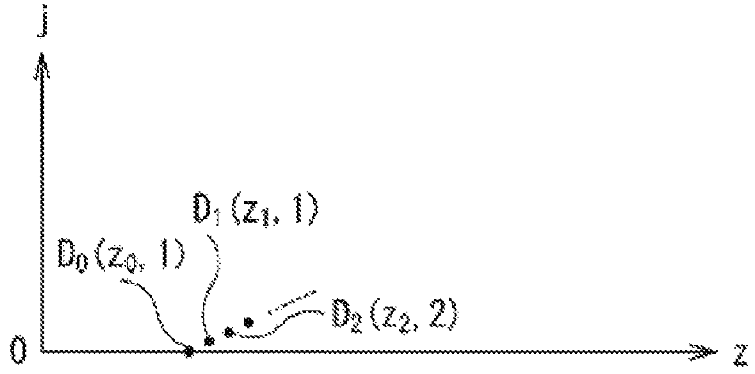

[FIG. 6]
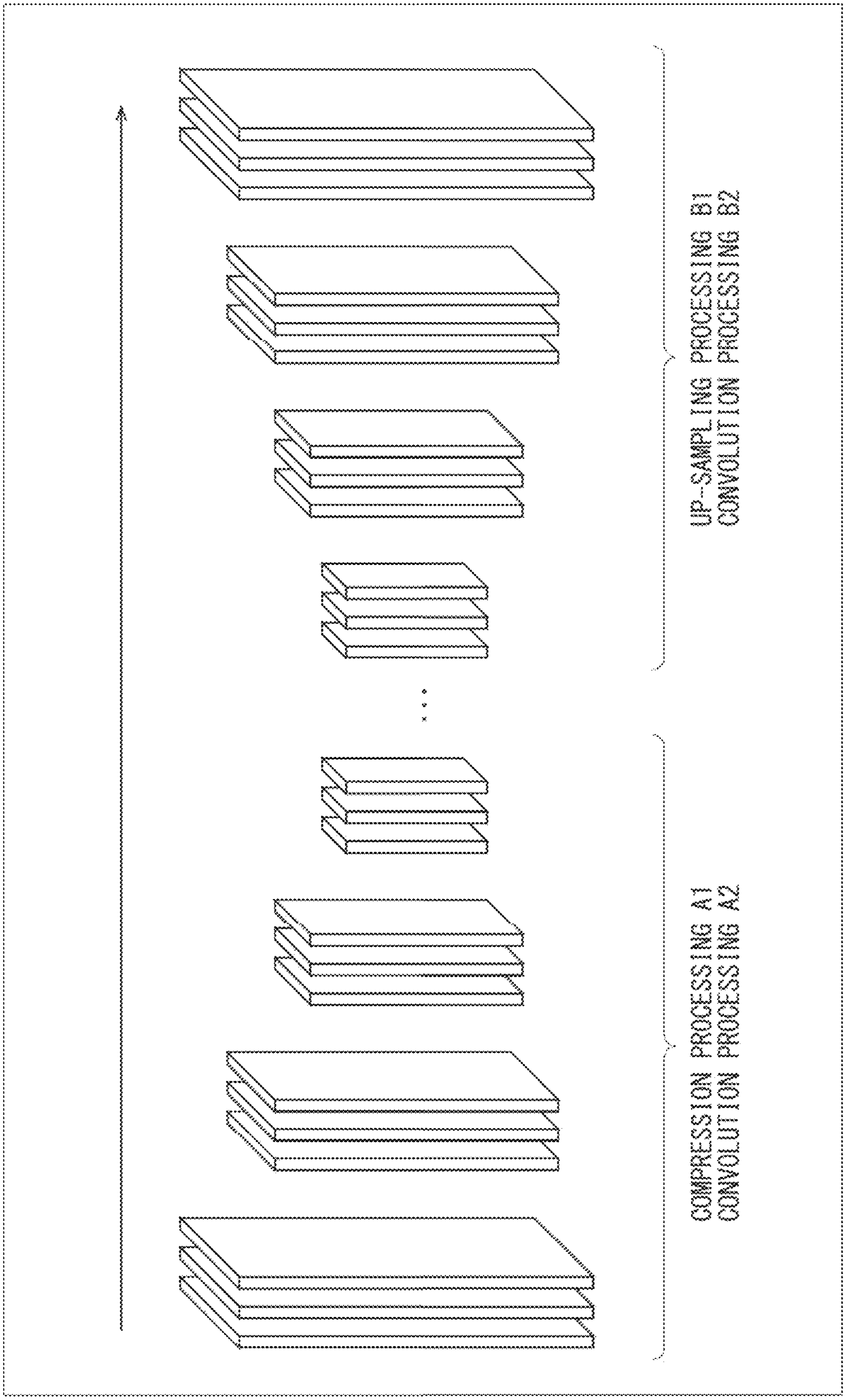

[ FIG. 7 ]
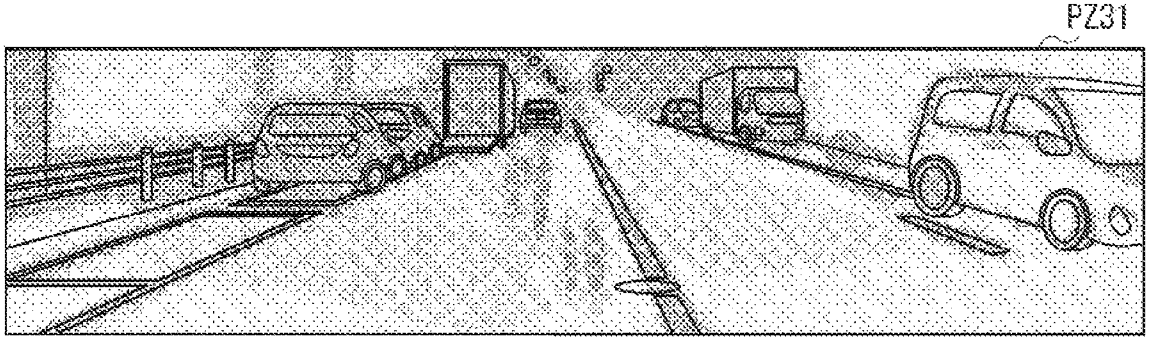
[ FIG. 8 ]
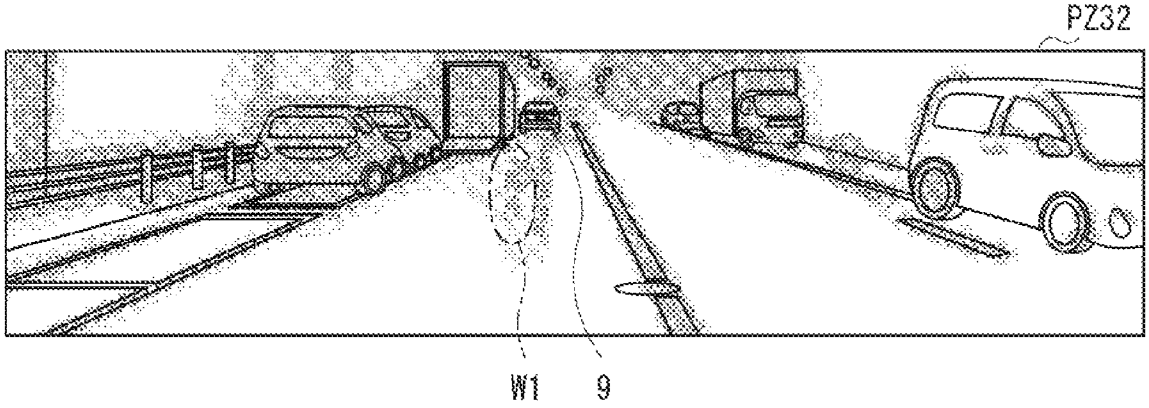
[ FIG. 9 ]
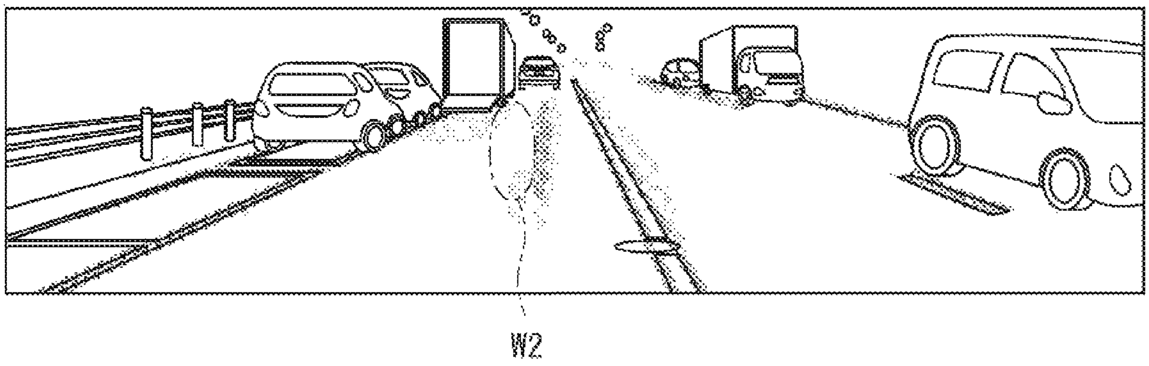

[ FIG. 10 ]
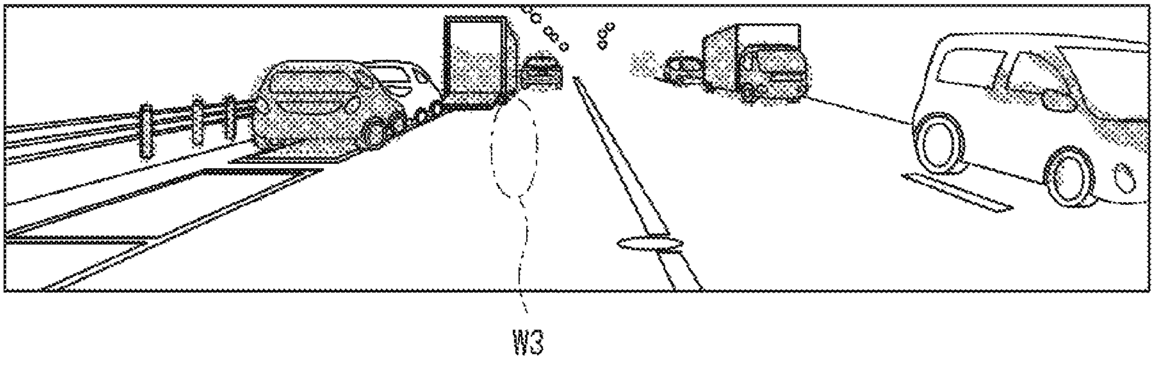
[ FIG. 11 ]
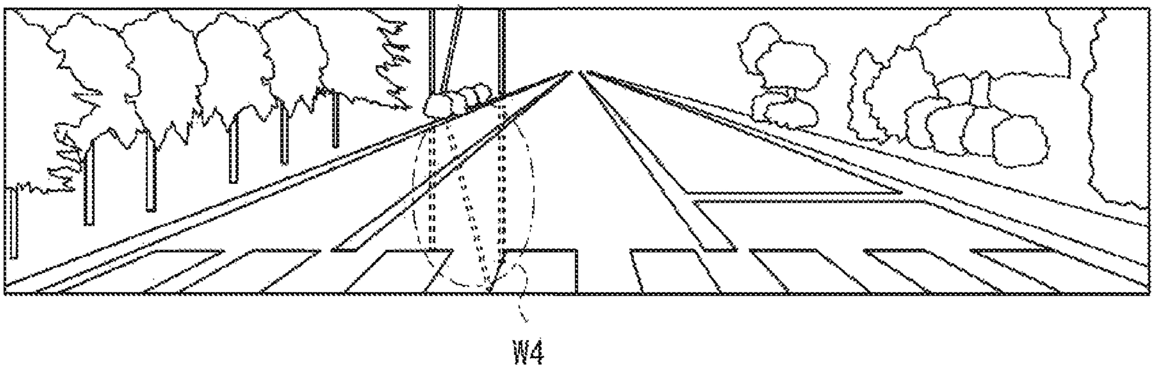
[ FIG. 12 ]
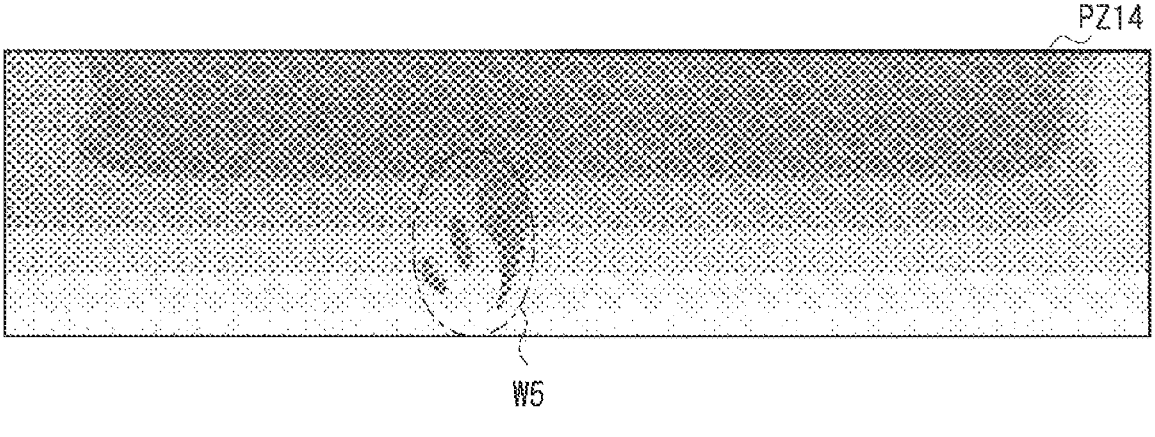

[ FIG. 13 ]
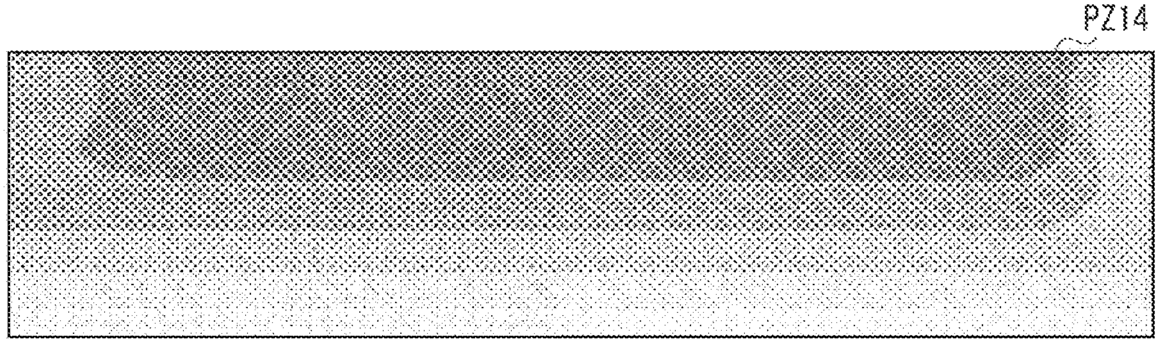

[ FIG. 14 ]
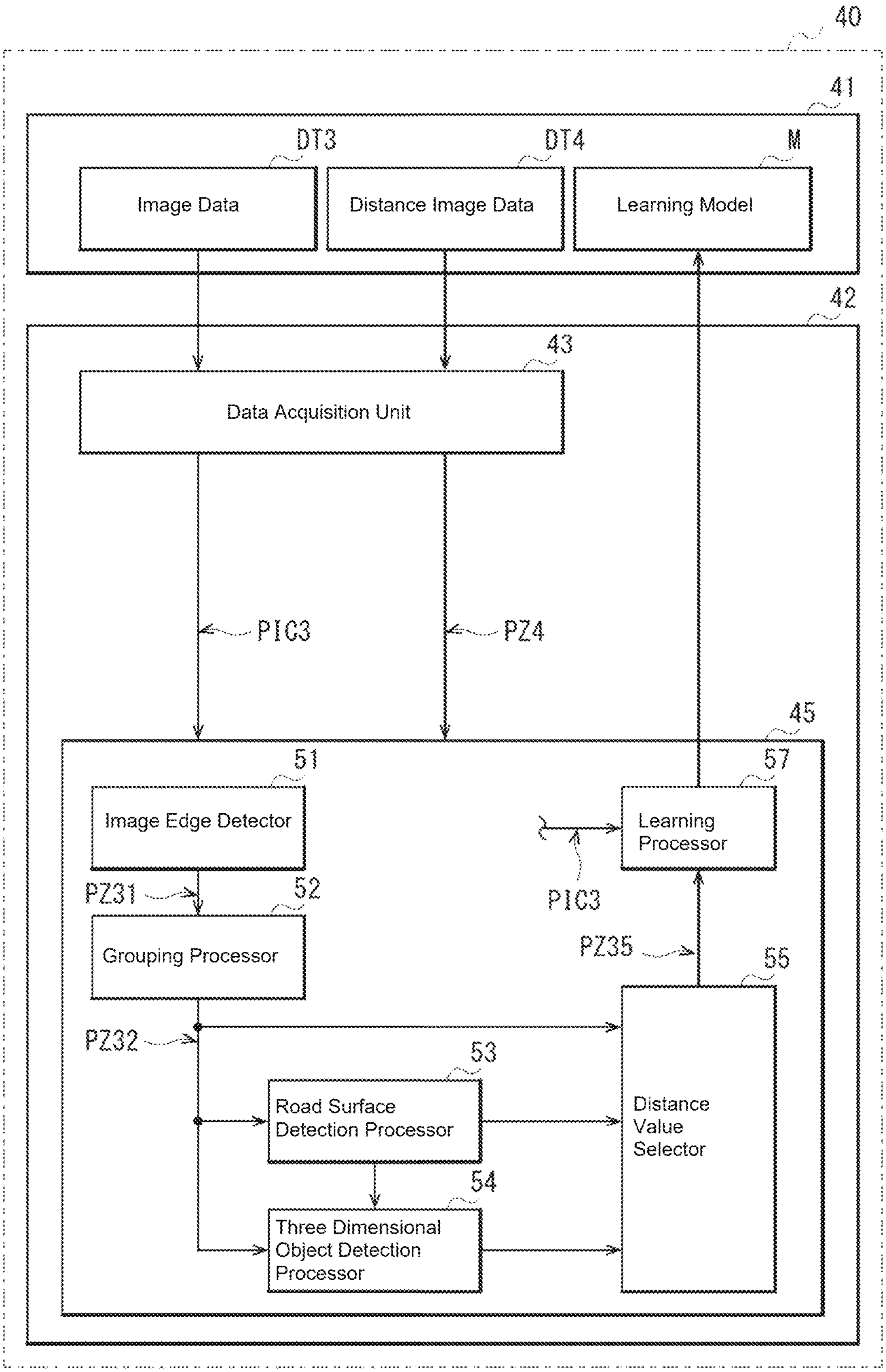

[ FIG. 15 ]
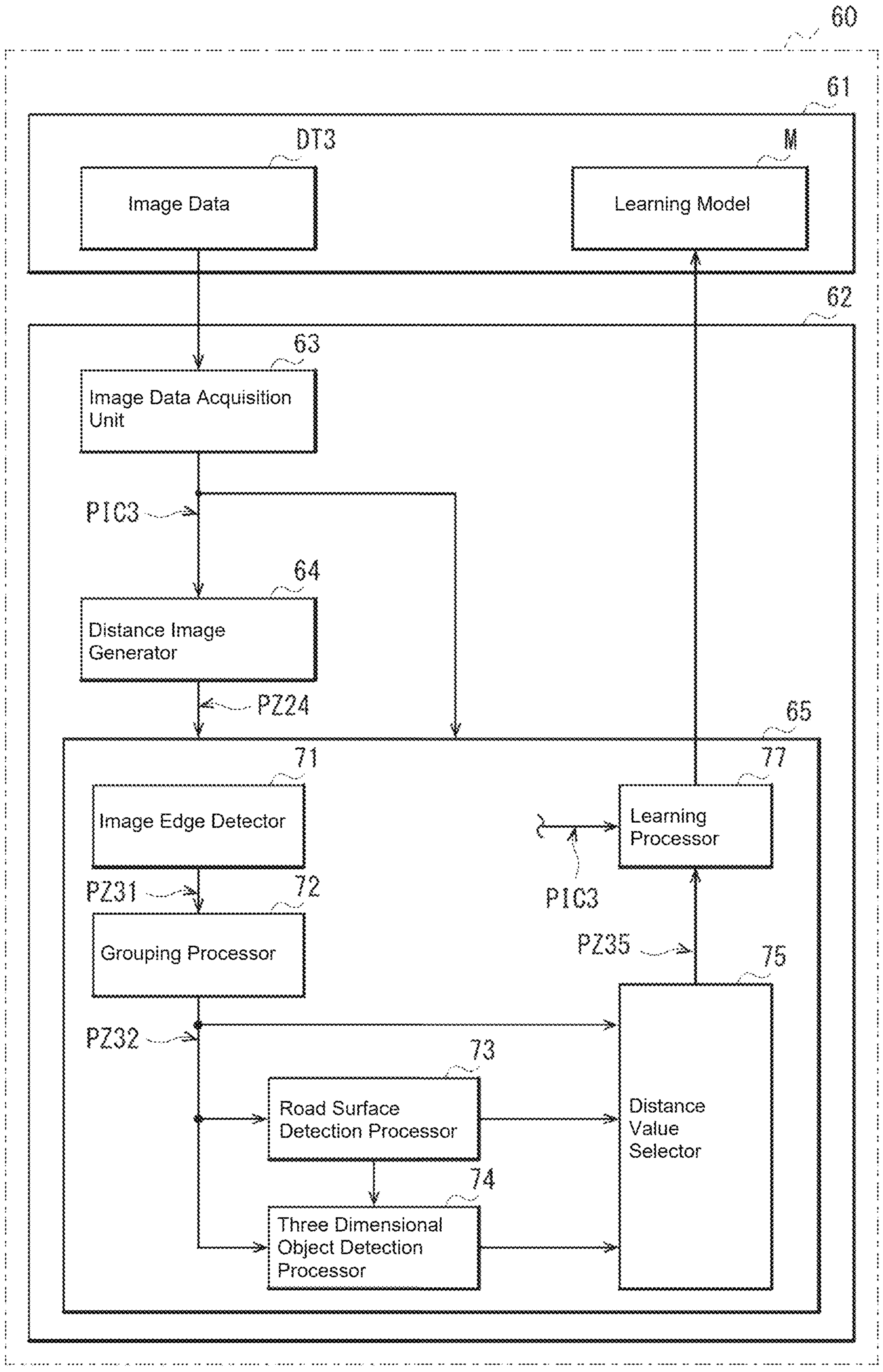

[ FIG. 16 ]
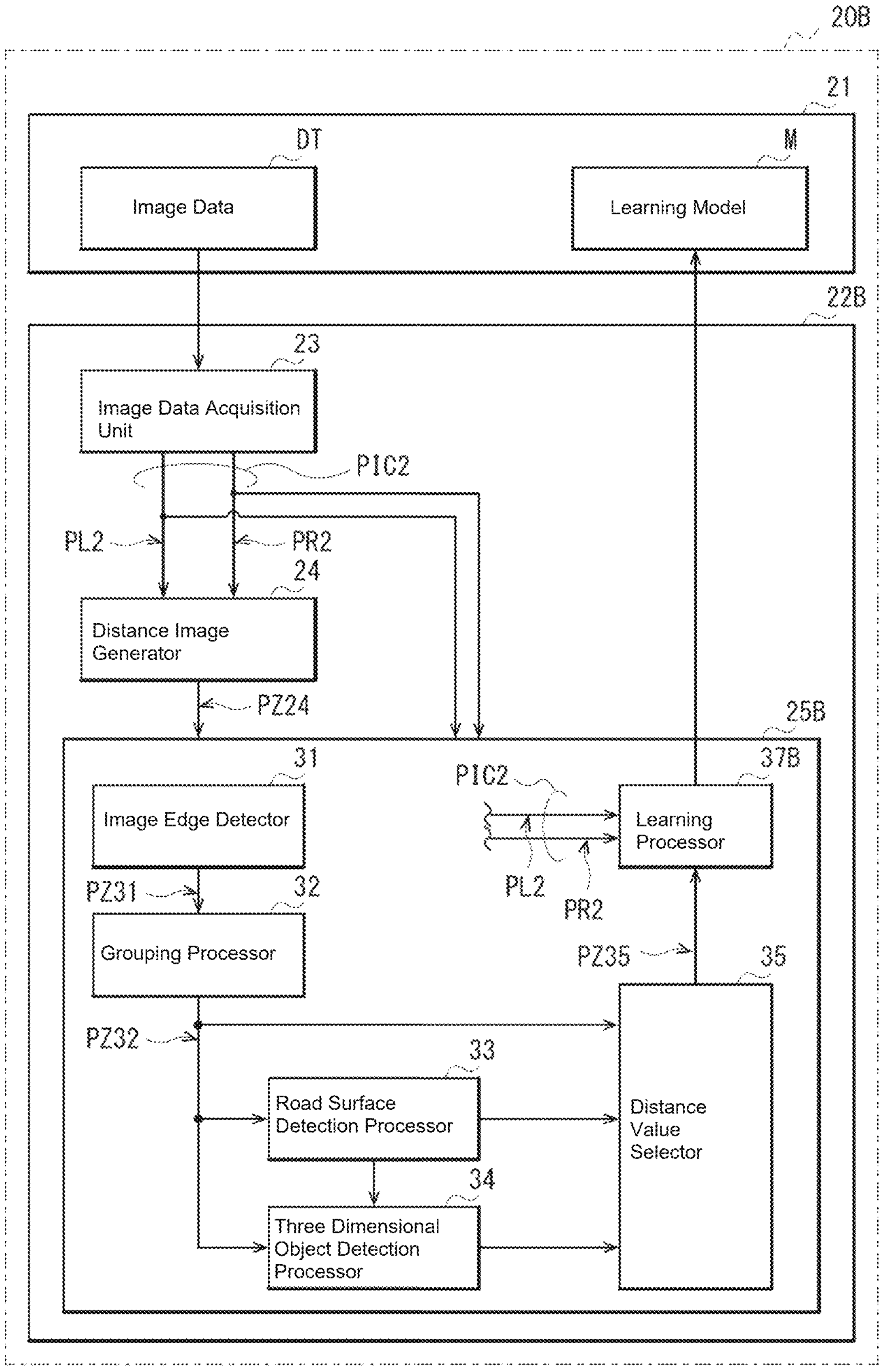

MACHINE LEARNING DEVICE

CROSS REFERENCE TO RELATED APPLICATION

The present application is a U.S. National Phase Application under 35 U.S.C. § 371 of International Patent Application No. PCT/JP2021/025580 filed Jul. 7, 2021. The entire contents of which are hereby incorporated by reference.

TECHNICAL FIELD

The disclosure relates to a machine learning device that carries out learning processing on the basis of a captured image and a distance image.

BACKGROUND

In a vehicle, vehicle external environment is often detected. On the basis of a result of the detection, a control of the vehicle is made. In recognizing the vehicle external environment, a distance from the vehicle to a nearby three-dimensional object is often detected. Japanese Unexamined Patent Application Publication No. 2018-147286 discloses a technique of carrying out calculation processing of a neural network on the basis of a captured image and a distance image.

SUMMARY

Here, there is a learning model that generates a distance image on the basis of a captured image. For the distance image generated, high accuracy is desired, with expectation for more enhanced accuracy.

It is desirable to provide a machine learning device that makes it possible to generate a learning model that generates a highly accurate distance image.

A machine learning device according to an embodiment of the disclosure includes a road surface detection processor, a distance value selector, and a learning processor. The road surface detection processor is configured to detect, on the basis of a first captured image and a first distance image depending on the first captured image, a road surface included in the first captured image. The distance value selector is configured to select one or more distance values to be processed, from among distance values included in the first distance image, on the basis of a processing result of the road surface detection processor. The learning processor is configured to generate a learning model to be supplied with a second captured image and to output a second distance image depending on the second captured image, by carrying out machine learning processing on the basis of the first captured image and the one or more distance values.

According to the machine learning device related to the embodiment of the disclosure, it is possible to generate a learning model that generates a highly accurate distance image.

BRIEF DESCRIPTION OF DRAWINGS

FIG. 1 is a block diagram that illustrates a configuration example of a vehicle external environment recognition system in which learning data is used that is generated by a machine learning device according to an embodiment of the disclosure.

FIG. 2 is a block diagram that illustrates a configuration example of the machine learning device according to the embodiment of the disclosure.

FIG. 3 is an explanatory diagram that illustrates an operation example of a road surface detection processor illustrated in FIG. 2.

FIG. 4 is another explanatory diagram that illustrates an operation example of the road surface detection processor illustrated in FIG. 2.

FIG. 5 is another explanatory diagram that illustrates an operation example of the road surface detection processor illustrated in FIG. 2.

FIG. 6 is an explanatory diagram that illustrates a configuration example of a neural network related to a learning model illustrated in FIG. 2.

FIG. 7 is an image diagram that illustrates an operation example of the machine learning device illustrated in FIG. 2.

FIG. 8 is another image diagram that illustrates an operation example of the machine learning device illustrated in FIG. 2.

FIG. 9 is another image diagram that illustrates an operation example of the machine learning device illustrated in FIG. 2.

FIG. 10 is another image diagram that illustrates an operation example of the machine learning device illustrated in FIG. 2.

FIG. 11 is an image diagram that illustrates an example of a captured image in the vehicle external environment recognition system illustrated in FIG. 1.

FIG. 12 is an image diagram that illustrates an example of a distance image according to a reference example, generated in the vehicle external environment recognition system illustrated in FIG. 1.

FIG. 13 is an image diagram that illustrates an example of a distance image generated in the vehicle external environment recognition system illustrated in FIG. 1.

FIG. 14 is a block diagram that illustrates a configuration example of a machine learning device according to a modification example.

FIG. 15 is a block diagram that illustrates a configuration example of a machine learning device according to another modification example.

FIG. 16 is a block diagram that illustrates a configuration example of a machine learning device according to another modification example.

DETAILED DESCRIPTION

In the following, some embodiments of the disclosure are described in detail with reference to the accompanying drawings.

FIG. 1 illustrates a configuration example of a vehicle external environment recognition system 10 in which processing is carried out with the use of a learning model generated by a machine learning device (machine learning device 20) according to an embodiment. The vehicle external environment recognition system 10 is mounted on a vehicle 100 such as an automobile. The vehicle external environment recognition system 10 includes a stereo camera 11 and a processor 12.

The stereo camera 11 is configured to generate a set of images (a left image PL1 and a right image PR1) having parallax from each other, by capturing a forward view of the vehicle 100. The stereo camera 11 includes a left camera 11L and a right camera 11R. Each of the left camera 11L and the right camera 11R includes a lens and an image sensor. In this example, the left camera 11L and the right camera 11R are disposed in spaced relation at a predetermined distance in a widthwise direction of the vehicle 100, in the vicinity of an upper portion of a windshield of the vehicle 100. The left camera 11L generates the left image PL1 and the right camera 11R generates the right image PR1. The left image PL1 and the right image PR1 constitute a stereo image PIC1. The stereo camera 11 generates a series of the stereo images PIC1 by performing imaging operation at a predetermined frame rate (for example, 60 [fps]), and supplies the generated stereo images PIC1 to the processor 12.

The processor 12 includes, for example, one or more processors that executes a program, one or more RAMs (Random Access Memory) that temporarily holds processing data, and one or more ROMs (Read Only Memory) that holds the program, without limitation. The processor 12 includes distance image generators 13 and 14, and a vehicle external environment recognition unit 15.

The distance image generator 13 is configured to generate a distance image PZ13, by carrying out predetermined image processing including, for example, stereo matching processing and filtering processing, on the basis of the left image PL1 and the right image PR1. Specifically, the distance image generator 13 identifies corresponding points including two image points (a left image point and a right image point) corresponding to each other, on the basis of the left image PL1 and the right image PR1. The left image point includes, for example, 16 pixels arranged in, for example, 4 rows and 4 columns, in the left image PL1. The right image point includes, for example, 16 pixels arranged in, for example, 4 rows and 4 columns, in the right image PR1. A difference between an abscissa value of the left image point in the left image PL1 and an abscissa value of the right image point in the right image PR1 corresponds to a distance value in the three-dimensional real space. The distance image generator 13 is configured to generate the distance image PZ13, on the basis of a plurality of the corresponding points identified. The distance image PZ13 includes a plurality of distance values. Each of the plurality of the distance values may be an actual distance value in the three-dimensional real space, or may be a parallax value that is a difference between the abscissa value of the left image point in the left image PL1 and the abscissa value of the right image point in the right image PR1.

The distance image generator 14 is configured to generate a distance image PZ14, with the use of a learning model M, on the basis of a captured image that is one of the left image PL1 or the right image PR1 in this example. The learning model M is a neural network model to be supplied with the captured image and to output the distance image PZ14. The learning model M is generated in advance by the machine learning device 20 described later and is held in the distance image generator 14 of the vehicle 100. As with the distance image PZ13, the distance image PZ14 includes a plurality of distance values.

The vehicle external environment recognition unit 15 is configured to recognize vehicle external environment around the vehicle 100, on the basis of the left image PL1, the right image PR1, and the distance images PZ13 and PZ14. On the basis of data regarding a three-dimensional object outside the vehicle recognized by the vehicle external environment recognition unit 15, the vehicle 100 is configured to be able to make, for example, a travel control of the vehicle 100, or display the data regarding the three-dimensional object recognized, on a console monitor.

FIG. 2 illustrates a configuration example of the machine learning device 20 that generates the learning model M. The machine learning device 20 is, for example, a server device. The machine learning device 20 includes a storage 21 and a processor 22.

The storage 21 is a nonvolatile storage device such as an HDD (Hard Disk Drive) or an SSD (Solid State Drive). The storage 21 holds image data DT and the learning model M.

The image data DT is image data regarding a plurality of stereo images PIC2. As with the stereo image PIC1 illustrated in FIG. 1, each of the plurality of the stereo images PIC2 is generated by a stereo camera and held in the storage 21. As with the stereo image PIC1 illustrated in FIG. 1, each of the plurality of the stereo images PIC2 includes a left image PL2 and a right image PR2.

The learning model M is a model to be used in the distance image generator 14 (FIG. 1) of the vehicle 100. The learning model M is generated by the processor 22 and held in the storage 21. Thus, the learning model M held in the storage 21 is set in the distance image generator 14 of the vehicle 100.

The processor 22 includes, for example, one or more processors that execute a program, one or more RAMs that temporarily hold processing data, without limitation. The processor 22 includes an image data acquisition unit 23, a distance image generator 24, and an image processor 25.

The image data acquisition unit 23 is configured to acquire the plurality of the stereo images PIC2 from the storage 21, and sequentially supply the distance image generator 24 with the left image PL2 and the right image PR2 included in each of the plurality of the stereo images PIC2.

As with the distance image generator 13 (FIG. 1) in the vehicle 100, the distance image generator 24 is configured to generate a distance image PZ24, by carrying out predetermined image processing including, for example, the stereo matching processing and the filtering processing, on the basis of the left image PL2 and the right image PR2.

The image processor 25 is configured to generate the learning model M, by carrying out predetermined image processing, on the basis of the left image PL2, the right image PR2, and the distance image PZ24. The image processor 25 includes an image edge detector 31, a grouping processor 32, a road surface detection processor 33, a three-dimensional object detection processor 34, a distance value selector 35, an image selector 36, and a learning processor 37.

The image edge detector 31 is configured to detect an image portion having strong edge intensity in the left image PL2 and detect an image portion having strong edge intensity in the right image PR2. Thus, the image edge detector 31 identifies a distance value that is obtained on the basis of the detected image portion and included in the distance image PZ24. That is, because the distance image generator 24 carries out the stereo matching processing on the basis of the left image PL2 and the right image PR2, the distance value obtained on the basis of the image portions having the strong edge intensity in the left image PL2 and the right image PR2 is expected to be highly accurate. Accordingly, the image edge detector 31 identifies a plurality of such distance values expected to be highly accurate, among the plurality of the distance values included in the distance image PZ24. Thus, the image edge detector 31 is configured to generate a distance image PZ31 including the plurality of the distance values identified.

The grouping processor 32 is configured to generate a distance image PZ32, by grouping a plurality of points between which distances in the three-dimensional space are close to one another, on the basis of the left image PL2, the right image PR2, and the distance image PZ31. That is, on the occasion that the distance image generator 24 carries out the stereo matching processing, there are cases where, depending on images, erroneous corresponding points are identified because of a mismatch. For example, the distance value related to the mismatch in the distance image PZ31 may deviate from the distance values in its surroundings. The grouping processor 32 is configured to be able to remove the distance value related to such a mismatch to some extent by carrying out the grouping processing.

The road surface detection processor 33 is configured to detect a road surface, on the basis of the left image PL2, the right image PR2, and the distance image PZ32.

FIGS. 3 to 5 illustrate an operation example of the road surface detection processor 33. First, as illustrated in FIG. 3, the road surface detection processor 33 sets a calculation target region RA, on the basis of, for example, one of the left image PL2 or the right image PR2. In this example, the calculation target region RA is a region sandwiched between two division lines 90L and 90R that divide lanes. Thus, as illustrated in FIG. 3, the road surface detection processor 33 sequentially selects a horizontal line HL, in the distance image PZ32, and generates a histogram with respect to the distance, on the basis of the distance values in a region of the calculation target region RA on each horizontal line HL. A histogram $H_j$ illustrated in FIG. 4 is a histogram related to a j-th horizontal line $HL_j$ from the bottom. The horizontal axis indicates a value of a coordinate z in a longitudinal direction of the vehicle, and the vertical axis indicates frequency. In this example, the frequency is the highest at a coordinate value $z_j$. The road surface detection processor 33 obtains this coordinate value $z_j$ at which the frequency is the highest, as a representative distance on the j-th horizontal line $HL_j$. In this way, the road surface detection processor 33 obtains the representative distances on a plurality of the horizontal lines HL. Thus, as illustrated in FIG. 5, the road surface detection processor 33 plots these representative distances as distance points D, on a z-j plane. In this example, on the z-j plane, plotted is a plurality of the distance points D including a distance point $D_0$ $(z_0,0)$ indicating the representative distance on the 0-th horizontal line $HL_0$, a distance point $D_1$ $(z_1,1)$ indicating the representative distance on the first horizontal line $HL_1$, and a distance point $D_2$ $(z_2,2)$ indicating the representative distance on the second horizontal line $HL_2$. In this example, these distance points D are disposed substantially in a straight line. The road surface detection processor 33 carries out fitting processing on the basis of, for example, these distance points D, to obtain a mathematical function indicating the road surface. In this way, the road surface detection processor 33 is configured to detect the road surface.

Moreover, the road surface detection processor 33 supplies the distance value selector 35 with data regarding the plurality of the distance values adopted in the road surface detection processing, among the plurality of the distance values included in the distance image PZ32. That is, as described above, the road surface detection processor 33 detects the road surface on the basis of the representative distance on each of the plurality of the horizontal lines HL. Accordingly, the plurality of the distance values that constitutes the representative distances on respective ones of the plurality of the horizontal lines HL is adopted in the road surface detection processing, while the plurality of the distance values that does not constitute the representative distances is not adopted in the road surface detection processing. The road surface detection processor 33 is configured to supply the distance value selector 35 with the data regarding the plurality of the distance values adopted in the road surface detection processing.

The three-dimensional object detection processor 34 is configured to detect a three-dimensional object, on the basis of the left image PL2, the right image PR2, and the distance image PZ32. The three-dimensional object detection processor 34 detects the three-dimensional object by grouping a plurality of points between which distances in the three-dimensional space are close to one another, above the road surface obtained by the road surface detection processor 33. Specifically, the three-dimensional object detection processor 34 is able to detect the three-dimensional object by grouping a plurality of points between which distances in the three-dimensional space are, for example, 0.1 m or less.

Moreover, the three-dimensional object detection processor 34 supplies the distance value selector 35 with data regarding the plurality of the distance values adopted in the three-dimensional object detection processing, among the plurality of the distance values included in the distance image PZ32. As described above, the three-dimensional object detection processor 34 detects the three-dimensional object, by grouping the plurality of the points between which the distances in the three-dimensional space are close to one another, above the road surface. Accordingly, the desired distance values in the vicinity of the three-dimensional object are adopted in the three-dimensional object detection processing. For example, as described later, the distance values related to mismatches near the three-dimensional object or the distance values related to mirror reflection in a case with a wet road surface are not adopted in the three-dimensional object detection processing. The three-dimensional object detection processor 34 supplies the distance value selector 35 with the data regarding the plurality of the distance values adopted in the three-dimensional object detection processing.

The distance value selector 35 is configured to select a plurality of distance values to be supplied to the learning processor 37, from among the plurality of the distance values included in the distance image PZ32 supplied from the grouping processor 32. The distance value selector 35 is able to select, for example, the plurality of the distance values used in the road surface detection processing, from among the plurality of the distance values included in the distance image PZ32, as the plurality of the distance values to be supplied to the learning processor 37. Moreover, the distance value selector 35 is able to select, for example, the plurality of the distance values used in the three-dimensional object detection processing, from among the plurality of the distance values included in the distance image PZ32, as the plurality of the distance values to be supplied to the learning processor 37. Moreover, the distance value selector 35 is able to select, for example, the plurality of the distance values used in the three-dimensional object detection processing and the road surface detection processing, from among the plurality of the distance values included in the distance image PZ32, as the plurality of the distance values to be supplied to the learning processor 37. Thus, the distance value selector 35 supplies the learning processor 37 with a distance image PZ32 including the plurality of the selected distance values.

The image selector 36 is configured to supply the learning processor 37 with a captured image P2 that is one of the left image PL2 or the right image PR2. The image selector 36 is configured to be able to select, for example, whichever image is clear, from the left image PL2 and the right image PR2, as the captured image P2.

The learning processor 37 is configured to generate the learning model M, by carrying out machine learning processing with the use of a neural network, on the basis of the captured image P2 and the distance image PZ35. The learning processor 37 is supplied with the captured image P2 and is supplied with the distance image PZ35 as an expected value. By carrying out the machine learning processing on the basis of these images, the learning processor 37 is configured to generate the learning model M to be supplied with the captured image and to output the distance image.

FIG. 6 illustrates a configuration example of the neural network. In this example, the captured image is inputted from the left of FIG. 6, and the distance image is outputted from the right of FIG. 6. In this neural network, for example, compression processing A1 is carried out on the basis of the captured image, and convolution processing A2 is carried out on the basis of the compressed data. In the neural network, the compression processing A1 and the convolution processing A2 are repeated a plurality of times. Thus, afterwards, up-sampling processing B1 is carried out on the basis of the generated data, and convolution processing B2 is carried out on the basis of the data subjected to the up-sampling processing B1. In the neural network, the up-sampling processing B1 and the convolution processing B2 are repeated a plurality of times. In the convolution processing A2 and B2, a filter of a predetermined size (e.g., 3 pixels×3 pixels) is used.

The learning processor 37 inputs the captured image P2 to the neural network and calculates each of difference values between a plurality of distance values in the outputted distance image and the plurality of the distance values in the distance image PZ35 that is the expected value. Thus, for example, the learning processor 37 adjusts a value of the filter to be used in the convolution processing A2 and B2 to allow these difference values to become sufficiently small. In this way, the learning processor 37 carries out the machine learning processing.

The learning processor 37 is able to provide setting as to whether or not to carry out learning processing for each image region, for example. Specifically, the learning processor 37 is able to carry out the machine learning processing on the image region to which the distance values are supplied from the distance value selector 35, and to refrain from carrying out the machine learning processing on the image region to which no distance values are supplied from the distance value selector 35. For example, the learning processor 37 is able to compulsively bring the difference value between the distance values to "O" in the image region to which no distance values are supplied from the distance value selector 35, to refrain the machine learning processing from being carried out on this image region.

For example, the neural network illustrated in FIG. 6 having the greater number of layers may make a learning model having a broad perspective. Inputting a blurred captured image to such a neural network and carrying out the machine learning processing make it possible to generate the learning model M that is able to obtain more distance values, on the basis of, for example, a captured image with little texture.

Here, the road surface detection processor 33 corresponds to a specific example of a "road surface detection processor" in the disclosure. The three-dimensional object detection processor 34 corresponds to a specific example of a "three-dimensional object detection processor" in the disclosure. The distance value selector 35 corresponds to a specific example of a "distance value selector" in the disclosure. The learning processor 37 corresponds to a specific example of a "learning processor" in the disclosure. The stereo image PIC2 corresponds to a specific example of a "first captured image" in the disclosure. The distance image PZ35 corresponds to a specific example of a "first distance image" in the disclosure.

Next, operation and workings of the machine learning device 20 and the vehicle external environment recognition system 10 according to the present embodiment are described.

First, the operation of the machine learning device 20 is described with reference to FIG. 2. The machine learning device 20 allows the storage 21 to hold the image data DT including the plurality of the stereo images PIC2 generated by, for example, the stereo camera. The image data acquisition unit 23 of the processor 22 acquires the plurality of the stereo images PIC2 from the storage 21, and sequentially supplies the distance image generator 24 with the left image PL2 and the right image PR2 included in each of the plurality of the stereo images PIC2. The distance image generator 24 generates the distance image PZ24, by carrying out the predetermined image processing including, for example, the stereo matching processing and the filtering processing, on the basis of the left image PL2 and the right image PR2. The image edge detector 31 of the image processor 25 detects the image portion having the strong edge intensity in the left image PL2 and detects the image portion having the strong edge intensity in the right image PR2. Thus, the image edge detector 31 identifies the distance values that are obtained on the basis of the detected image portions and included in the distance image PZ24, and generates the distance image PZ31 including the plurality of the distance values identified. The grouping processor 32 generates the distance image PZ32, by grouping the points between which the distances in the three-dimensional space are close to one another, on the basis of the left image PL2, the right image PR2, and the distance image PZ31. The road surface detection processor 33 detects the road surface, on the basis of the left image PL2, the right image PR2, and the distance image PZ32. Moreover, the road surface detection processor 33 supplies the distance value selector 35 with the data regarding the plurality of the distance values adopted in this road surface detection processing, among the plurality of the distance values included in the distance image PZ32. The three-dimensional object detection processor 34 detects the three-dimensional object, on the basis of the left image PL2, the right image PR2, and the distance image PZ32. Moreover, the three-dimensional object detection processor 34 supplies the distance value selector 35 with the data regarding the plurality of the distance values adopted in the three-dimensional object detection processing, among the plurality of the distance values included in the distance image PZ32. The distance value selector 35 selects the plurality of the distance values to be supplied to the learning processor 37, from among the plurality of the distance values included in the distance image PZ32 supplied from the grouping processor 32. The image selector 36 supplies the learning processor 37 with the captured image P2 that is one of the left image PL2 or the right image PR2. The learning processor 37 generates the learning model M, by carrying out the machine learning processing with the use of the neural network, on the basis of the captured image P2 and the distance image PZ35. Thus, the processor 22 allows the storage 21 to hold the learning model M. Thus, the learning model M generated in this way is set in the distance image generator 14 of the vehicle external environment recognition system 10.

Next, the operation of the vehicle external environment recognition system 10 is described with reference to FIG. 1. The stereo camera 11 generates the left image PL1 and the right image PR1 having the parallax from each other, by capturing the forward view of the vehicle 100. The distance image generator 13 of the processor 12 generates the distance image PZ13, by carrying out the predetermined image processing including, for example, the stereo matching processing and the filtering processing, on the basis of the left image PL1 and the right image PR1. The distance image generator 14 generates the distance image PZ14, with the use of the learning model M generated by the machine learning device 20, on the basis of the captured image that is one of the left image PL1 or the right image PR1 in this example. The vehicle external environment recognition unit 15 recognizes the vehicle external environment around the vehicle 100, on the basis of the left image PL1, the right image PR1, and the distance images PZ13 and PZ14.

Next, operation of the image processor 25 (FIG. 2) in the machine learning device 20 is described in detail.

First, the image edge detector 31 detects the image portion having the strong edge intensity in the left image PL2 and detects the image portion having the strong edge intensity in the right image PR2. Thus, the image edge detector 31 identifies the distance value that is obtained on the basis of the detected image portion and included in the distance image PZ24. That is, because the distance image generator 24 carries out the stereo matching processing on the basis of the left image PL2 and the right image PR2, the distance values obtained on the basis of the image portions having the strong edge intensity in the left image PL2 and the right image PR2 are expected to be highly accurate. Accordingly, the image edge detector 31 identifies the plurality of the distance values expected to be highly accurate, among the plurality of the distance values included in the distance image PZ24. Thus, the image edge detector 31 generates the distance image PZ31 including the plurality of the distance values identified.

FIG. 7 illustrates an example of the distance image PZ31. In FIG. 7, shading indicates a portion having distance values. Gradation of the shading indicates a density of the distance values. That is, a thin shaded portion has a low density of the distance values obtained, while a thick shaded portion has a high density of the distance values obtained. For example, road surfaces have little texture and it is difficult to detect corresponding points in the stereo matching. Accordingly, road surfaces have a low density of the distance values. Meanwhile, for example, division lines on road surfaces and three-dimensional objects such as vehicles have a high density of the distance values, because it is easy to detect corresponding points in the stereo matching.

Next, the grouping processor 32 generates the distance image PZ32, by grouping the plurality of the points between which the distances in the three-dimensional space are close to one another, on the basis of the left image PL2, the right image PR2, and the distance image PZ31.

FIG. 8 illustrates an example of the distance image PZ32. In this distance image PZ32, the distance values are removed from, for example, the portion having the low density of the distance values obtained, as compared with the distance image PZ31 illustrated in FIG. 7. On the occasion that the distance image generator 24 carries out the stereo matching processing, there is possibility that, depending on images, erroneous corresponding points are identified because of a mismatch. For example, a portion having little texture, e.g., a road surface, has few corresponding points, and also has many corresponding points related to such mismatches. The distance values related to mismatches may deviate from the distance values in its surroundings. The grouping processor 32 is able to remove the distance values related to such mismatches to some extent, by carrying out the grouping processing.

In FIG. 8, for example, the road surface is wet because of rain, causing the mirror reflection from the road surface. A portion W1 illustrates an image of a tail lamp of a preceding vehicle 9 reflected from the road surface. The distance value in this portion W1 may correspond to a distance from the vehicle to the preceding vehicle 9. However, this image itself appears on the road surface. Such a virtual image may be included in the distance image PZ32.

Next, the road surface detection processor 33 detects the road surface, on the basis of the left image PL2, the right image PR2, and the distance image PZ32. Moreover, the road surface detection processor 33 supplies the distance value selector 35 with the data regarding the plurality of the distance values adopted in the road surface detection processing, among the plurality of the distance values included in the distance image PZ32.

FIG. 9 illustrates the distance image indicating the plurality of the distance values adopted in the road surface detection processing, among the plurality of the distance values included in the distance image PZ32. As illustrated in FIG. 9, each of the plurality of the distance values adopted in the road surface detection processing is located in a portion corresponding to the road surface. That is, each of the plurality of these distance values indicates a distance from the vehicle to the road surface.

In this distance image, as illustrated in a portion W2, the distance values caused by the virtual image by the mirror reflection are removed. That is, as described above, the distance value in the portion W1 of FIG. 8 may correspond to the distance from the vehicle to the preceding vehicle 9. However, in the histogram related to each of the plurality of the horizontal lines HL in the road surface detection processing, the frequency at this distance value is low. Accordingly, this distance value is unlikely to be the representative distance. As a result, this distance value is not adopted in the road surface detection processing, and therefore, it is removed from the distance image illustrated in FIG. 9.

As described, in the distance image (FIG. 9) indicating the plurality of the distance values adopted in the road surface detection processing, the noise of the distance values is reduced, as compared with the distance image PZ32 illustrated in FIG. 8. Next, the three-dimensional object detection processor 34 detects the three-dimensional object, on the basis of the left image PL2, the right image PR2, and the distance image PZ32. Moreover, the three-dimensional object detection processor 34 supplies the distance value selector 35 with the data regarding the plurality of the distance values adopted in the three-dimensional object detection processing, among the plurality of the distance values included in the distance image PZ32.

FIG. 10 illustrates the distance image indicating the plurality of the distance values adopted in the three-dimensional object detection processing, among the plurality of the distance values included in the distance image PZ32. As illustrated in FIG. 10, the plurality of the distance values adopted in the three-dimensional object detection processing is located in respective portions corresponding to these three-dimensional objects. That is, each of the plurality of these distance values indicates the distance from the vehicle to the three-dimensional object located above the road surface.

The three-dimensional object detection processor 34 detects the three-dimensional object, by grouping the plurality of the points between which the distances in the three-dimensional space are close to one another, above the road surface. The distance values related to mismatches near the three-dimensional object may deviate from the distance values in its surroundings. Accordingly, the three-dimensional object detection processor 34 is able to remove the distance values related to mismatches on the side surface or the wall of the vehicle.

Even in this distance image, as illustrated in a portion W3, the distance values caused by the virtual image by the mirror reflection are removed. That is, as described above, the distance value in the portion W1 of FIG. 8 may correspond to the distance from the vehicle to the preceding vehicle 9. However, this image itself appears on the road surface. Accordingly, the position in the three-dimensional space obtained on the basis of this image is under the road surface. The three-dimensional object detection processor 34 detects the three-dimensional object on the basis of an image above the road surface. As a result, this distance value is not adopted in the three-dimensional object detection processing, and therefore, it is removed from the distance image illustrated in FIG. 10.

As described, in the distance image (FIG. 10) indicating the plurality of the distance values adopted in the three-dimensional object detection processing, the noise of the distance values is reduced, as compared with the distance image PZ32 illustrated in FIG. 8.

The distance value selector 35 selects the plurality of the distance values to be supplied to the learning processor 37, from among the plurality of the distance values included in the distance image PZ32 supplied from the grouping processor 32. The distance value selector 35 is able to select, for example, the plurality of the distance values used in the road surface detection processing, from among the plurality of the distance values included in the distance image PZ32, as the plurality of the distance values to be supplied to the learning processor 37. Moreover, the distance value selector 35 is able to select, for example, the plurality of the distance values used in the three-dimensional object detection processing, from among the plurality of the distance values included in the distance image PZ32, as the plurality of the distance values to be supplied to the learning processor 37. Moreover, the distance value selector 35 is able to select, for example, the plurality of the distance values used in the three-dimensional object detection processing and the road surface detection processing, from among the plurality of the distance values included in the distance image PZ32, as the plurality of the distance values to be supplied to the learning processor 37. Thus, the distance value selector 35 supplies the learning processor 37 with the distance image PZ35 including the plurality of the selected distance values. In this way, the learning processor 37 is supplied with the distance image PZ35 in which the noise of the distance values is reduced.

The image selector 36 supplies the learning processor 37 with the captured image P2 that is one of the left image PL2 or the right image PR2. Thus, the learning processor 37 generates the learning model M, by carrying out the machine learning processing with the use of the neural network, on the basis of the captured image P2 and the distance image PZ35. The learning processor 37 is supplied with the captured image P2, and is supplied with the distance image PZ35 as the expected value. Because the learning processor 37 is supplied with the distance image PZ35 in which the noise of the distance values is reduced, it is possible to generate the learning model M with high accuracy.

Next, description is given of the distance image PZ14 generated by the distance image generator 14 of the vehicle external environment recognition system 10, with the use of the learning model M generated in this way.

FIG. 11 illustrates an example of the captured image generated by the stereo camera 11 in the vehicle external environment recognition system 10. In FIG. 11, for example, the road surface is wet because of rain, causing the mirror reflection from the road surface. A portion W4 illustrates an image of a utility pole reflected from the road surface.

FIGS. 12 and 13 illustrate an example of the distance image PZ14 generated by the distance image generator 14 with the use of the learning model M on the basis of the captured image illustrated in FIG. 11. FIG. 12 illustrates a case where, in the machine learning device 20, the learning model M is generated on the basis of all of the plurality of the distance values included in the distance image PZ32. FIG. 13 illustrates a case where, in the machine learning device 20, the learning model M is generated on the basis of the plurality of the distance values used in the three-dimensional object detection processing and the road surface detection processing, among the plurality of the distance values included in the distance image PZ32. In FIGS. 12 and 13, the gradation of the shading indicates the size of the distance value. The thin shading indicates that the distance value is small, and the thick shading indicates that the distance value is large.

In the example of FIG. 12, as illustrated in a portion W5, influences of the virtual image by the mirror reflection causes disturbance in the distance values. Although the distance to the road surface with the reflection of the utility pole is small, the actual distance to the utility pole is large. Accordingly, as illustrated in FIG. 12, the distance value in the portion W5 is large. As described, the distance image generator 14 outputs the distance value as it is, on the basis of the captured image inputted.

In the example of FIG. 12, the learning model M is generated, in the machine learning device 20, on the basis of all of the plurality of the distance values included in the distance image PZ32. That is, the learning model M is learned with the use of, for example, the captured image including the image portion by the mirror reflection, and the distance image (e.g., FIG. 8) including the erroneous distance values due to the mirror reflection. Accordingly, in a case where, as illustrated in FIG. 11, the captured image inputted includes the image portion by the mirror reflection such as the portion W4, the distance image generator 14 outputs the distance value corresponding to the image portion, as illustrated in FIG. 12.

Meanwhile, in the example of FIG. 13, there occurs no disturbance in the distance value as seen in FIG. 12. In the example of FIG. 13, the learning model M is generated, in the machine learning device 20, on the basis of the plurality of the distance values used in the three-dimensional object detection process and the road surface detection process, among the plurality of the distance values included in the distance image PZ32. That is, the learning model M is learned with the use of, for example, the image including the mirror reflection, and the distance image (e.g., FIGS. 9 and 10) that does not include the erroneous distance values due to the mirror reflection. That is, the erroneous distance values due to the mirror reflection are not used in the machine learning processing. The machine learning processing is carried out with the use of the stereo image PIC2 in various situations such as various weather conditions and various time zones. The plurality of these stereo images PIC2 also include, for example, images without the mirror reflection. Accordingly, even in the case where the inputted captured image (FIG. 11) includes the image portion by the mirror reflection such as the portion W4, the distance image generator 14 is able to reflect the learning on such various conditions, and output the distance value in the case without the mirror reflection, as illustrated in FIG. 13.

As described above, the machine learning device 20 includes the road surface detection processor 33, the distance value selector 35, and the learning processor 37. The road surface detection processor 33 detects the road surface included in the first captured image (stereo image PIC2), on the basis of the first captured image (stereo image PIC2) and the first distance image (distance image PZ32) depending on the first captured image (stereo image PIC2). The distance value selector 35 selects the one or more distance values to be processed, from among the plurality of the distance values included in the first distance image (distance image PZ32), on the basis of the processing result of the road surface detection processor 33. The learning processor 37 generates the learning model M to be supplied with the second captured image and to output the second distance image depending on the second captured image, by carrying out the machine learning processing on the basis of the first captured image (stereo image PIC2) and the one or more distance values. This makes it possible for the machine learning device 20 to carry out the machine learning processing on the basis of the one or more distance values selected on the basis of the processing result of the road surface detection processor 33, among the plurality of the distance values included in the distance image PZ32. The distance value selector 35, for example, the machine learning device 20, is able to select the distance values (FIG. 9) adopted in the road surface detection processing, as the one or more distance values, and select the distance values (FIG. 10) adopted in the three-dimensional object detection processing of detecting the three-dimensional object on the road surface, as the one or more distance values. In this way, in the machine learning device 20, it is possible to generate the learning model M that generates the highly accurate distance image.

In generating such a learning model M, there is possibility that machine learning is carried out with the use of a distance image obtained by using, for example, a Lidar (Light detection and ranging) device, and a captured image. However, an image sensor that generates the captured image, and the Lidar device that generates the distance image differ in characteristics from each other. Accordingly, for example, there may occur a case where nothing appears in the captured image, but a distance value is obtained in the distance image. In the case with such inconsistency, it is difficult to carry out the machine learning processing.

Meanwhile, in the machine learning device 20, in the example illustrated in FIG. 2, the distance images PZ24, PZ31, and PZ32 are generated on the basis of the stereo image PIC2. Accordingly, the inconsistency as described above hardly occurs, and it is possible to easily carry out the machine learning processing. As a result, in the machine learning device 20, it is possible to enhance the accuracy of the learning model.

Moreover, even in the case where the machine learning processing is carried out with the use of the distance image PZ24 generated on the basis of the stereo image PIC2 generated by the stereo camera, a mismatch occurs, or a virtual image appears by, for example, the mirror reflection, as described above. This causes the distance image PZ24 to include incorrect distance values. Accordingly, it is difficult to improve the accuracy of the learning model. Moreover, it is conceivable to sort out correct distance values from incorrect distance values in the distance image PZ24. However, it is unrealistic, for example, for a person to sort them out.

Meanwhile, in the machine learning device 20, the one or more distance values to be processed, among the plurality of the distance values included in the first distance image (distance image PZ32) are selected on the basis of the processing result of the road surface detection processor 33. The machine learning processing is carried out on the basis of the first captured image (stereo image PIC2) and the one or more distance values. Thus, in the machine learning device 20, it is possible to reduce the influences of, for example, mismatches or the mirror reflection. It is possible to sort out the correct distance values without involving annotation work by a person. As a result, in the machine learning device 20, it is possible to enhance the accuracy of the learning model.

In the machine learning device 20, in the example illustrated in FIG. 2, the distance images PZ24, PZ31, and PZ32 are generated by the stereo matching. In the case where the stereo matching is carried out as described, it is possible to obtain the highly accurate distance values. However, because the matching occurs locally, there may be cases where the density of the distance values is low. Even in such cases, using the learning model M generated by the machine learning device 20 makes it possible to obtain the highly accurate distance values with the high density in the whole region.

Moreover, in the machine learning device 20, the learning processor 37 is configured to carry out the machine learning processing on the image region corresponding to the one or more distance values within the whole image region of the first captured image (stereo image PIC2), on the basis of the one or more distance values. This makes it possible for the learning processor 37 to carry out the machine learning processing, on the image region to which the distance values are supplied from the distance value selector 35, and refrain from carrying out the machine learning processing, on the image region to which no distance values are supplied from the distance value selector 35. As a result, for example, it is possible to prevent the machine learning processing from being carried out on the basis of the erroneous distance values due to the mirror reflection. This leads to enhanced accuracy of the learning model.

As described above, in the present embodiment, the road surface detection processor, the distance value selector, and the learning processor are provided. The road surface detection processor detects the road surface included in the first captured image, on the basis of the first captured image and the first distance image depending on the first captured image. The distance value selector selects the one or more distance values to be processed, from among the plurality of the distance values included in the first distance image, on the basis of the processing result of the road surface detection processor. The learning processor generates the learning model to be supplied with the second captured image and to output the second distance image depending on the second captured image, by carrying out the machine learning processing on the basis of the first captured image and the one or more distance values. Hence, it is possible to generate the learning model that generates the highly accurate distance image.

In the present embodiment, the machine learning processing is carried out on the image regions corresponding to the one or more distance values within the whole image region of the first captured image, on the basis of the one or more distance values. Hence, it is possible to enhance the accuracy of the learning model.

In the forgoing embodiment, the machine learning device 20 carries out the machine learning processing on the basis of the distance image PZ24 generated on the basis of the stereo image PIC2, but this is non-limiting. In the following, the present modification example is described in detail by giving several examples.

FIG. 14 illustrates a configuration example of a machine learning device 40 according to the present modification example. The machine learning device 40 is configured to carry out the machine learning processing on the basis of a distance image obtained by a Lidar device. The machine learning device 40 includes a storage 41 and a processor 42.

The storage 41 holds image data DT3 and distance image data DT4. In this example, the image data DT3 is image data regarding a plurality of captured images PIC3. Each of the plurality of the captured images PIC3 is a monocular image, generated by a monocular camera, and held in the storage 41. The distance image data DT4 is image data regarding a plurality of distance images PZ4. The plurality of the distance images PZ4 corresponds respectively to the plurality of the captured images PIC3. In this example, the distance image PZ4 is generated by the Lidar device and held in the storage 41.

The processor 42 includes a data acquisition unit 43 and an image processor 45.

The data acquisition unit 43 is configured to acquire the plurality of the captured images PIC3 and the plurality of the distance images PZ4, from the storage 41, and sequentially supply the image processor 45 with corresponding ones of the captured images PIC3 and the distance images PZ4.

The image processor 45 is configured to generate the learning model M, by carrying out predetermined image processing, on the basis of the captured image PIC3 and the distance image PZ4. The image processor 45 includes an image edge detector 51, a grouping processor 52, a road surface detection processor 53, a three-dimensional object detection processor 54, a distance value selector 55, and a learning processor 57. The image edge detector 51, the grouping processor 52, the road surface detection processor 53, the three-dimensional object detection processor 54, the distance value selector 55, and the learning processor 57 correspond respectively to the image edge detector 31, the grouping processor 32, the road surface detection processor 33, the three-dimensional object detection processor 34, the distance value selector 35, and the learning processor 37 according to the forgoing embodiment.

The learning processor 57 is configured to generate the learning model M, by carrying out the machine learning processing with the use of the neural network, on the basis of the captured image PIC3 and the distance image PZ35. The learning processor 57 is supplied with the captured image PIC3, and is supplied with the distance image PZ35 as the expected value. By carrying out the machine learning processing on the basis of these images, the learning processor 57 is configured to generate the learning model M to be supplied with the captured image and to output the distance image. Here, the captured image PIC3 corresponds to a specific example of the "first captured image" in the disclosure.

For example, the distance image generator 14 of the vehicle external environment recognition system 10 illustrated in FIG. 1 is able to generate the distance image PZ14, on the basis of the captured image that is one of the left image PL1 or the right image PR1, with the use of the learning model M generated by such a machine learning device 40.

FIG. 15 illustrates a configuration example of another machine learning device 60 according to the present modification example. The machine learning device 60 is configured to carry out the machine learning processing on the basis of a distance image obtained by a motion stereo technique. The machine learning device 60 includes a storage 61 and a processor 62.

The storage 61 holds the image data DT3. In this example, the image data DT3 is image data regarding a series of the plurality of the captured images PIC3. Each of the plurality of the captured images PIC3 is a monocular image, is generated by a monocular camera, and is held in the storage 61.

The processor 62 includes an image data acquisition unit 63, a distance image generator 64, and an image processor 65.

The image data acquisition unit 63 is configured to acquire the series of the plurality of the captured images PIC3 from the storage 61, and sequentially supply the captured images PIC3 to the distance image generator 64.

The distance image generator 64 is configured to generate the distance image PZ24, by the motion stereo technique, on the basis of the two captured images PIC3 adjacent to each other on a time axis, among the series of the plurality of the captured images PIC3.

The image processor 65 is configured to generate the learning model M, by carrying out the predetermined image processing, on the basis of the captured image PIC3 and the distance image PZ24. The image processor 65 includes an image edge detector 71, a grouping processor 72, a road surface detection processor 73, a three-dimensional object detection processor 74, a distance value selector 75, and a learning processor 77. The image edge detector 71, the grouping processor 72, the road surface detection processor 73, the three-dimensional object detection processor 74, the distance value selector 75, and the learning processor 77 correspond respectively to the image edge detector 31, the grouping processor 32, the road surface detection processor 33, the three-dimensional object detection processor 34, the distance value selector 35, and the learning processor 37 according to the forgoing embodiment.

The learning processor 77 is configured to generate the learning model M, by carrying out the machine learning processing with the use of the neural network, on the basis of the captured image PIC3 and the distance image PZ35. The learning processor 77 is supplied with the captured image PIC3, and is supplied with the distance image PZ35 as the expected value. By carrying out the machine learning processing on the basis of these images, the learning processor 77 is configured to generate the learning model M to be supplied with the captured image and to output the distance image.

For example, the distance image generator 14 of the vehicle external environment recognition system 10 illustrated in FIG. 1 is able to generate the distance image PZ14, on the basis of the captured image that is one of the left image PL1 or the right image PR1, with the use of the learning model M generated by such a machine learning device 60.

In the forgoing embodiment, the learning model M is configured to be supplied with the captured image and to output the distance image, but the image to be inputted is not limited thereto. For example, a stereo image may be inputted. Moreover, in the case of motion stereo, two captured images adjacent to each other on the time axis may be inputted. The case where a stereo image is inputted is described in detail below.

FIG. 16 illustrates a configuration example of a machine learning device 20B according to the present modification example. The machine learning device 20B includes a processor 22B. The processor 22B includes an image processor 25B. The image processor 25B includes the image edge detector 31, the grouping processor 32, the road surface detection processor 33, the three-dimensional object detection processor 34, the distance value selector 35, and a learning processor 37B.

The learning processor 37B is configured to generate the learning model M, by carrying out the machine learning processing with the use of the neural network, on the basis of the stereo image PIC2 and the distance image PZ35. The learning processor 37B is supplied with the stereo image PIC2, and is supplied with the distance image PZ35 as the expected value. By carrying out the machine learning processing on the basis of these images, the learning processor 37B is configured to generate the learning model M to be supplied with the stereo image and to output the distance image.

For example, the distance image generator 14 of the vehicle external environment recognition system 10 is able to generate the distance image PZ14, on the basis of the stereo image PIC1, with the use of the learning model M generated by such a machine learning device 20B.

Although the technology has been described in the forgoing by giving the embodiments and some modification examples, the technology is by no means limited to these embodiments, etc., and various modifications may be made.

For example, in the forgoing embodiments, etc., the image processor 25 is provided with the image edge detector 31, the grouping processor 32, the road surface detection processor 33, and the three-dimensional object detection processor 34, but this is non-limiting. For example, some of these may be omitted, or other blocks may be added.

It is to be noted that the effects described herein are merely examples and non-limiting, and other effects may be also produced.

It is to be noted that the technology may have the following configurations.

(1)

A machine learning device including:

a road surface detection processor that detects, on the basis of a first captured image and a first distance image depending on the first captured image, a road surface included in the first captured image;

a distance value selector that selects one or more distance values to be processed, from among a plurality of distance values included in the first distance image, on the basis of a processing result of the road surface detection processor; and a learning processor that generates a learning model to be supplied with a second captured image and to output a second distance image depending on the second captured image, by carrying out machine learning processing on the basis of the first captured image and the one or more distance values.

(2)

The machine learning device according to (1), in which the distance value selector selects, as the one or more distance values, a distance value adopted in detection processing in the road surface detection processor, from among the plurality of the distance values included in the first distance image.

(3)

The machine learning device according to (2), in which the one or more distance values include a distance value to the road surface included in the first captured image.

(4)

The machine learning device according to (1) to (3), further including a three-dimensional object detection processor that detects a three-dimensional object located above the road surface included in the first captured image, in which the distance value selector selects, as the one or more distance values, a distance value adopted in detection processing in the three-dimensional object detection processor, from among the plurality of the distance values included in the first distance image.

(5)

The machine learning device according to (4), in which the one or more distance values include a distance value to the three-dimensional object located above the road surface included in the first captured image.

(6)

The machine learning device according to (1), in which the learning processor carries out, on the basis of the one or more distance values, the machine learning processing on an image region corresponding to the one or more distance values, within a whole image region of the first captured image.

(7)

A machine learning device including:

one or more processors; and one or more memories communicably coupled to the one or more processors, the one or more processors being configured to carry out road surface detection processing of detecting, on the basis of a first captured image and a first distance image depending on the first captured image, a road surface included in the first captured image, select one or more distance values to be processed, from among a plurality of distance values included in the first distance image, on the basis of a processing result of the road surface detection processing, and generate a learning model to be supplied with a second captured image and to output a second distance image depending on the second captured image, by carrying out machine learning processing on the basis of the first captured image and the one or more distance values.

The invention claimed is:

1. A machine learning device comprising:

one or more memories; and one or more processors coupled to the one or more memories and configured to:

generate a first distance image including first distance values obtained by comparing a first image portion with a second image portion, the first image portion including strong edge intensity in a first image of a first captured image that is stereo image, the second image portion including strong edge intensity in a second image other than the first image of the first captured image;

generate a second distance image including second distance values by grouping the first distance values between which distances in a three-dimensional space are close to one another;

execute road surface detection processing including:

(i) in one of the first image and the second image, determine a first region located between two division lines that divide lanes;

(ii) in a second region corresponding to the first region in the second distance image, determine representative distances for horizontal lines located within the second region, each of the representative distances indicating a most frequent class of distance among the second distance values comprised in each of the horizontal lines; and (iii) based on the representative distances, detect a road surface in the first region;

determine third distance values from among the second distance values, the third distance values constituting the representative distances;

detect, based on the first captured image and the second distance image, a three-dimensional object located above the detected road surface;

determine fourth distance values from among the second distance values, the fourth distance values corresponding to the detected three-dimensional object;

select a clear image from among the first image and the second image included in the first captured image;

generate a learning model by performing machine learning processing using (i) a region of the clear image and (ii) an expected value of a distance value corresponding to the region of the clear image, the region being a part of the clear image where the expected value exists, the expected value including one or both of the third distance values and the fourth distance values; and apply the generated learning model to a captured image to output a distance image depending on the captured image.

* * * * *